United States Patent [19]

Murch

[11] 3,927,147
[45] Dec. 16, 1975

[54] HALOALKOXY DERIVATIVES OF THE CYCLOPHOSPHONITRILIC CHLORIDE-HEXAMETHYLPHOSPHORAMIDE ADDUCT

[75] Inventor: Robert M. Murch, Ashton, Md.

[73] Assignee: The United States of America as represented by the Secretary of the Navy, Washington, D.C.

[22] Filed: Jan. 25, 1974

[21] Appl. No.: 436,778

[52] U.S. Cl..... 260/927 N; 260/543 PN; 260/551 P
[51] Int. Cl.$^2$...................... C07F 9/141; C07F 9/50
[58] Field of Search....... 260/927 N, 543 PN, 551 P

[56] References Cited
UNITED STATES PATENTS

| 3,002,586 | 10/1961 | Rabourn, Jr.............. 260/551 P X |
| 3,304,350 | 2/1967 | Kober et al................ 260/927 N X |
| 3,311,622 | 3/1967 | Joffre ......................... 260/551 P X |
| 3,794,701 | 2/1974 | Bik............................. 260/927 N X |

OTHER PUBLICATIONS

CA 74:55000h, Godfrey et al., "Alkoxyphosphazenes as Flame Retardants for Rayon," 1970.
Shaw et al., "The Phosphazenes," Chemical Reviews 62, p. 260, 268 (1962).

Primary Examiner—Daniel E. Wyman
Assistant Examiner—Thomas A. Waltz
Attorney, Agent, or Firm—R. S. Sciascia; Arthur L. Branning; Thomas McDonnell

[57] ABSTRACT

The adduct of a cyclophosphonitrilic chloride $(PNCl_2)_3$ and hexamethylphosphoramide $(Me_2N)_3PO$ when reacted with an alcohol yields a reaction product that is useful as an additive to general purpose polyester resins enhancing the resin's fire retardant characteristics.

1 Claim, No Drawings

HALOALKOXY DERIVATIVES OF THE CYCLOPHOSPHONITRILIC CHLORIDE-HEXAMETHYLPHOSPHORAMIDE ADDUCT

BACKGROUND OF THE INVENTION

General purpose polyester resins can be used for most types of molding and laminating. By polyester is meant the polycondensation product of dicarboxylic acids with dihydroxy alcohols in contradistinction to materials known as alkyds. These polyester compounds may be modified by mono-carboxylic acids, monohydroxy alcohols and small amounts of polycarboxylic acids or polyhydroxy alcohols. Such compounds have a wide range of properties and a particular resin may have properties that may make it suitable for one purpose but unsuitable for another. For example, high viscoisty resins are useful in vertical layup, where low visocity resins, however, would be required when rapid penetration was desirable.

Because of the wide range of properties that are common to polyester resins their use varies greatly. Polyester resins are used as plasticizers in coatings and plastics to provide toughness and flexability in such materials as cellulose acetate, polystyrene, polyvinyl chloride, etc. Other saturated polyesters, prepared principally from ethylene glycol and terephalic acid, are used as fibers and films. As fibers they are used to produce fabrics. As films they are used because of their strength, toughness and electrical properties. Polyesters are also used to produce polyurethane foams, coating and adhesives.

While the uses of general purpose polyester resins continue to steadily grow, such resins suffer from the drawback that due to their high hydrogen and carbon content they continue to burn fairly readily once ignited. Since much concern has been generated by consumers to reduce the flammability of products such as flammable fabrics, manufacturers have had to find ways to reduce the flammability of polyesters and polyester resins.

The flammability of polyester compounds has been attempted to be reduced in a number of ways. These include the addition of inorganic fillers and organic fire-retardants, chemical modifications of the saturated or unsaturated acid in the resin, chemical modification of the monomer and chemical combination of organometallic compounds with the resin.

Inorganic fillers do not necessarily reduce the burning rate of polyester resins. For example, glassfibers often increase the burning rate. Antimony oxides are often used as inorganic fillers to reduce the burning rate, but they impart opacity and must often be used with a chlorinated parafin to increase its effectiveness which is a disadvantage because the often plasticize and thereby upset some of the properties of the resin. They also tend to "sweat-out" of laminates after contineous outside exposure resulting in a breakdown of the laminate.

Chemical modification of the unsaturated polyester is often accomplished by the use of tri- $\beta$-chloroethyl phosphate. The use, however, of this plasticizing additive quite often lowers the outside durability of the resin. Tetrabromophthalic anhydride can be used rather than tetrachlorophthalic but its curing characteristics are too unreliable to use them commercially.

Thus, while the techniques used to reduce the flammability of polyester resins do so to some extent, all suffer from some drawback.

SUMMARY OF THE INVENTION

By adding an alkoxy derivative to general purpose polyester resins, a resin of low flammability is produced.

It is therefore a object of the present invention to provide general purpose polyester resins having low flammability characteristics.

Another object of the invention is to provide an additive which when added to general purpose polyester resins will ehnance the fire retardancy of those resins.

Yet another object of the invention is to provide a method for enhancing the fire retardancy of polyester resins.

Other objects, advantages and novel features of the invention will become apparent from the following detailed description.

DETAILED DESCRIPTION

In accordance with the novel aspects of the invention, general purpose polyester resins are rendered fire retardant by adding thereto an alkoxy derivative. By "fire retardant" is meant that the resin is resistant to flame after the igniting flame has been removed. In other words the fire retardant polyester resins will not support combustion by itself. when in contact with an open flame, however, it may become charred.

Generally, polyesters are formed by the reaction of a dibasic acid with a polyhydric alcohol, such as, ethylene gycol. If either the acid or the alcohol is unsaturated, an unsaturated polyester is obtained that is capable of subsequent cross-linking either directly to similar unsaturated double bonds in adjacent polyester chains of the same structure or through an unsaturated double bond in a monomer such as styrene. An example of the latter is poly (propylene maleate/ phthalate) in styrene which has long been used as a guide to compare with other more complex polyester resins. It is produced by reacting 2 moles of propylene glycol, 1 mole of phthalic anhydride, 1 mole of maleic anhydride, hydroquinone equal to 0.2% by volume of the final solution, and monomer styrene equaling 35% by volume of the final solution. In the examples hereinafter presented poly (propylene maleate/ phthalate) in styrene was used to test the ability of the additive to render polyester resins fire retardant.

The additive is produced by reacting hexachlorocyclotriphosphonitrile $(PNCl_2)_3$ with hexamethylphosphoramide $(Me_2N)_3PO$ to form an adduct. For best results it is suggested that a stoichiometric amount of $(PNCl_2)_3$ be added to $(Me_2N)_3PO$. This adduct is then reacted with an alcohol to yield the alkoxy derivative that is the additive of the invention. Generally 4 molar equivalents of the alcohol is reacted with the adduct.

Alcohols found useful are $\beta$-chloroethanol, 3,3,3-trichloroethanol, 1,3-dichloro-2propanol, and 2,3-dibromopropanol. It is expected that a good many other alcohols will yield similar results. When the alkoxy derivative is added to the general purpose polyester resin such that it is present in an amount ranging from about 5% to 20% by weight, the fire retardancy of the resin's enhanced.

As stated previously, polyester resins may be cross linked either directly or through an unsaturated monomer. When crosslinked quite often a catalyst is used.

Among the catalysts useful for such purposes are the peroxides. Some decompose at high temperatures, therefore, the choice of an appropriate catalyst depends on the intended molding or curing temperature. Benzoyl peroxide starts to decompose at 50°C and is therefore, used for resins which are cured at high temperatures. Methylethyl ketone peroxide is used at lower temperatures especially with a cobalt accelator such as cobalt naphthenate. Table I taken from *Polyesters and their Applications*, Bjorksten Research Laboratories, Inc. Reinhold Publishing Corp., New York, 1956, p. 49 lists commonly used peroxide catalysts.

TABLE I

| Trade Name | Composition | Physical form | Peroxide assay % | supplier* |
|---|---|---|---|---|
| | Benzoyl peroxide | granules | 96 | 2 |
| | Benzoyl peroxide | Fine granules | 96 | 2 |
| | Benzoyl peroxide purified | Fine crystals | 96 | 2 |
| LUCIDOL | Benzoyl peroxide | Fine crystals | 96 | 1 |
| LUPERCO ATC | Benzoyl peroxide compounded with tricresyl phosphate | Thick paste | 50 | 1 |
| CADOX BTP | Benzoyl peroxide compounded with tricresyl phosphate | Thick paste | 50 | 2 |
| LUPERCO CDB | 2,4-Dichlorobenzoyl peroxide compounded with dibutyl phythalate | Thick paste | 50 | 1 |
| LUPERSOL DDM | Methylethyl ketone peroxide in dimethyl phthalate | Liquid | 60 | 1 |
| CADON MDP | Methylethyl ketone peroxide in dimethyl phthalate | Liquid | 60 | 2 |
| | Cyclohexanone peroxide (mixed ketone peroxides) | Granules | 96 | 1 |
| LUPERCO JDB | Cyclohexanone peroxide compounded with dibutyl phthalate | Thick paste | 50 | 1 |
| | Cumene hydroperoxide | Liquid | 73 (as hydroperoxide) | 3 |

(1) Lucidol Division, Wallace and Tiernan, Inc., Buffalo, N.Y.
(2) McKesson and Robbins, Inc., Chemical Division, N.Y. (distributors for Cadet Chemical Corp., Buffalo, N.Y.)
(3) Hercules Power Co., Naval Stores Dept., Wilmington, Del.

Other peroxide catalysts mentioned in the polyester patent literature are bis(para-bromobenzoyl) peroxide, bis(phthalyl) peroxide, bis(para-chlorobenzoly)peroxide, bis(succinyl) peroxide, acetylbenzoyl peroxide, bis(chloroacetyl) peroxide, bis(acetyl) peroxide, tertiary-butyl perbenzoate, tertiary-butyl hydroperoxide, bis(dichlorobenzoyl) peroxide, oxonides such as di-isopropylene oxonide and di-isobytylene oxonide, peracetic acid, perbenzoic acid, benzoyl peracetate, and peroxycarbonates such as ethyl peroxydicarbonate.

Accelators other than cobalt napthenate may be used as well. Among these are the vanadium accelators and dimethyl-p-toluidine. Other catalysts such as dimethylaniline may be used as well. When using these accelerators and catalysts to promote crosslinking the polyester resin, it may be beneficial to heat the resin. The temperature at which to heat the resin is dependent upon the curing system being employed and is well within the skill of the art.

In order to more fully illustrate the invention the following examples are presented. The purpose of the examples is to illustrate the fire retardancy characteristics obtained by adding the alkoxy derivative to a general purpose polyester resin that is often used to make comparisons with other complex polyester resins. Therefore, the use herein of the general purpose polyester is meant to be illustrative and not a limitation as to the scope of the invention.

EXAMPLE I

Hexachlorocyclotriphosphonitrile, 13.9g and hexamethylphosphoramide, 7.16g were place in a 500 ml reaction vessel with 150 ml of benzene. The mixture was heated to the reflux temperature, 80°C, and held for three hours, then stirred overnight without heating. The solvent was removed and a white solid weighing 15.5g was recovered. This material had an infrared spectrum that was different from either starting material with prominent bands at 850 and 870 cm$^{-1}$. The implication is a compound similar to phosphineimines.

EXAMPLE II

Hexamethylphosphoramide, 7.2g, and hexachlorocyclotriphosphonitrile, 13.9g, were heated in benzene for four hours, then after cooling, trichloroethanol, 23.8g, was added slowly, followed by 12.6g of pyridine as an HCl acceptor. The reaction mixture was heated to the reflux temperature for eight hours. Then the mixture was filtered while still hot to remove the byproduced pyridine hydrochloride. The product was a brown, vicous liquid. Its infrared spectrum had the adsorptions expected for alkoxy phosphonitriles and also the characteristic bands for phosphineimines.

EXAMPLE III

In a similar fashion, the 1,3-dichloro-2propanol derivative was prepared by adding 20.6g of 1,3-dichloro-2propanol to the prereacted hexamethylphosphoramide-phosphonitrile adduct in the presence of pyridine. The product boiled above 80°C at 0.1mm Hg.

EXAMPLE IV

In a similar fashion the 2,3-dibromopropyl derivative was prepared by adding four mole equivalents of 2,3-dibromopropanol to the hexamethylphosphoramide-phosphonitrile adduct in the presence of pyridine. The product, a viscous oil, was isolated after refluxing the reaction mixture for two hours, filtering the pyridine hydrochloride and then removing the byproducts by distillation.

EXAMPLE V

The additive prepared in Example III was added at the 5% level to the general purpose resin and cured for four hours at 70°C after standing at room temperature for two hours. The product had a Barcol hardness of 40 and an oxygen of 0.25.

EXAMPLE VI

The additive prepared in Example II was added to the 5% level to a general purpose resin and the mixture was cured by adding 0.02g of a cobalt accelerator, 0.2g of a peroxide and 0.2g of a base dimethylaniline. The primary curing occurs at ambient temperatures, but a post curing period of four hours at 70°C helped develop the final properties; Barcol hardness of 40, oxygen index of 0.24.

Example I illustrates the manner in which the adduct of hexachlorocyclotriphosphonitrile and hexamethylphosphoramide is produced. Examples II-IV illustrates the production of three different alkoxy derivatives by reacting the adduct of Example I with various alcohols. Examples V and VI are illustrative of the use of alkoxy derivatives used as fire retardant additives to the polyester resins.

In the examples the oxygen index was obtained by using the method disclosed under ASTMD2863-70. By "oxygen index" is meant the minimum oxygen concentration, expressed in volume percent, in a mixture of oxygen and nitrogen that will just support combustion of a material under the conditions of the method. Accordingly, a material having a high oxygen index requires more oxygen to support combustion, and is therefore more fire retardant then are having a low oxygen index. In each of the examples the additive enhanced the fire retardation capabilities of the polyester resin.

The polyester resin used in the examples has an oxygen index of 0.18. It is apparent that the use of the additive of the invention significantly increases the fire retardancy of the resin.

Obviously many modification and variations of the present invention are possible in light of the above teachings. It is therefore to be understood that within the scope of the appended claims the invention may be practiced otherwise than as specifically described.

I claim:

1. An additive for enhancing the fire retardance characteristics of general purpose polyester resins comprising an alkoxy derivative formed by the reaction of an alcohol selected from the group consisting of $\beta$-chloroethanol, 3,3,3-trichloroethanol, 2,3-dibromopropanol and 1,3-dichloro-2-propanol with the adduct of $(PNCl_2)_3$ and $(Me_2N)_3PO$.

* * * * *